United States Patent
Kurata et al.

(10) Patent No.: US 11,263,092 B2
(45) Date of Patent: Mar. 1, 2022

(54) RESOURCE ALLOCATION OPTIMIZATION FOR CLOUD BURSTING USE CASE

(71) Applicant: Hitachi, Ltd., Tokyo (JP)

(72) Inventors: Naruki Kurata, San Jose, CA (US); Masanori Takada, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 70 days.

(21) Appl. No.: 16/812,001

(22) Filed: Mar. 6, 2020

(65) Prior Publication Data

US 2021/0279143 A1    Sep. 9, 2021

(51) Int. Cl.
*G06F 12/00* (2006.01)
*G06F 11/14* (2006.01)
*G06F 3/06* (2006.01)

(52) U.S. Cl.
CPC .......... *G06F 11/1464* (2013.01); *G06F 3/067* (2013.01); *G06F 3/0617* (2013.01); *G06F 3/0647* (2013.01); *G06F 3/0653* (2013.01); *G06F 3/0683* (2013.01); *G06F 11/1458* (2013.01); *G06F 11/1469* (2013.01)

(58) Field of Classification Search
CPC ............. G06F 11/1464; G06F 11/1458; G06F 3/0647; G06F 3/067; G06F 11/1469; G06F 3/0653; G06F 3/0617
See application file for complete search history.

(56) References Cited

U.S. PATENT DOCUMENTS

| | | | |
|---|---|---|---|
| 9,336,166 B1 * | 5/2016 | Faibish | G06F 12/0246 |
| 10,754,798 B1 * | 8/2020 | Burke | G06F 13/4282 |
| 2004/0181641 A1 * | 9/2004 | Nguyen | G06F 3/0671 |
| | | | 711/162 |
| 2016/0366217 A1 | 12/2016 | Eda et al. | |
| 2018/0095682 A1 * | 4/2018 | Agombar | G06F 3/0665 |
| 2019/0318058 A1 * | 10/2019 | Baeckler | G06F 30/398 |
| 2021/0034533 A1 * | 2/2021 | Benhanokh | G06F 12/0866 |
| 2021/0117120 A1 * | 4/2021 | Edwards | G06F 3/067 |

* cited by examiner

*Primary Examiner* — John A Lane
(74) *Attorney, Agent, or Firm* — Procopio, Cory, Hargreaves & Savitch LLP

(57) ABSTRACT

Embodiments described herein are directed to a cloud-bursting system utilizing optimal resources on a remote site within the range of requirements of business operation ordered by a user. Embodiments can involve receiving user requirements for the copy operation of a storage volume, and for a determination that the copy operation of the storage volume meets the user requirements, executing the copy operation on the storage volume from the first storage system to the second storage system; and continuously adjusting the end-point to facilitate a copy speed of the storage volume that meets the user requirements.

15 Claims, 10 Drawing Sheets

| Workload ID | Source volume ID | Target workload start time | Target workload end time |
|---|---|---|---|
| 1 | 1 | Oct. 1 0:00AM | Oct. 1 1:00AM |
| 2 | ... | ... | ... |
| ... | ... | ... | ... |

FIG. 3

| Source volume ID | Capacity | Copy speed (Max.) |
|---|---|---|
| 1 | 360GB | 500MB/s |
| 2 | 500GB | 100MB/s |
| ... | ... | ... |

FIG. 4

| Source volume ID | Destination volume ID | Capacity | Target volume copy performance | Target end-point copy performance |
|---|---|---|---|---|
| 1 | 100 | 360GB | 150MB/s | 160MB/s |
| 2 | ... | ... | ... | ... |
| ... | ... | ... | ... | ... |

FIG. 5

| Destination volume ID | Copy start time | Target copy end time | Estimated copy end time |
|---|---|---|---|
| 100 | Oct. 1 0:00AM | Oct. 1 1:00AM | Oct. 1 0:40AM |
| ... | ... | ... | ... |
| ... | ... | ... | ... |

FIG. 6

| Workload ID | Data Capacity | Average target volume copy performance | Average target end-point copy performance | Average actual copy performance | Required time |
|---|---|---|---|---|---|
| 1 | 360GB | 150MB/s | 160MB/s | 120MB/s | 0:40 |
| 2 | 500GB | 10MB/s | 12MB/s | 8MB/s | 2:30 |
| ... | ... | ... | ... | ... | ... |

FIG. 7

RESOURCE ALLOCATION OPTIMIZATION FOR CLOUD BURSTING USE CASE

BACKGROUND

Field

The present disclosure is generally directed to cloud implementations, and more specifically, for facilitating resource allocation during burst periods in cloud implementations.

Related Art

Public clouds are becoming more popular and used by some traditional companies such as financial enterprises.

Such companies still use on-premise datacenters to execute their tasks, especially mission-critical workloads. However, there are some cases that they also execute periodical workloads which cause overload for the on-premises. These companies are willing to use a public cloud as "cloud-bursting" resource to deal with both executing periodical workloads and reducing their Information Technology (IT) assets.

In the related art, there is a cloning mechanism in a hybrid cloud storage environment by optimizing data location inside hard disk drives (HDDs). In another related art implementation, there is a system that caches an on-premise data in a public cloud is disclosed. This system selects data to cache based on the capacity of the public cloud's storage and frequency of reference.

SUMMARY

However, such related art implementations do not have a mechanism to meet requirements of business operation by cloud-bursting.

Aspects of the present disclosure involve a method for facilitating a copy operation of a storage volume from a first storage system to a second storage system through an end-point, the end-point facilitating a network connection between the first storage system and the second storage system, the method involving receiving user requirements for the copy operation of a storage volume; for a determination that the copy operation of the storage volume meets the user requirements, executing a copy operation on the storage volume from the first storage system to the second storage system; and continuously adjusting the end-point to facilitate a copy speed of the storage volume that meets the user requirements.

Aspects of the present disclosure involve a non-transitory computer readable medium, storing instructions for executing a process for facilitating a copy operation of a storage volume from a first storage system to a second storage system through an end-point, the end-point facilitating a network connection between the first storage system and the second storage system, the instructions involving receiving user requirements for the copy operation of a storage volume; for a determination that the copy operation of the storage volume meets the user requirements, executing a copy operation on the storage volume from the first storage system to the second storage system; and continuously adjusting the end-point to facilitate a copy speed of the storage volume that meets the user requirements.

Aspects of the present disclosure involve a system for facilitating a copy operation of a storage volume from a first storage system to a second storage system through an end-point, the end-point facilitating a network connection between the first storage system and the second storage system, the system involving means for receiving user requirements for the copy operation of a storage volume; for a determination that the copy operation of the storage volume meets the user requirements, means for executing a copy operation on the storage volume from the first storage system to the second storage system; and means for continuously adjusting the end-point to facilitate a copy speed of the storage volume that meets the user requirements.

Aspects of the present disclosure involve an apparatus configured to facilitate a copy operation of a storage volume from a first storage system to a second storage system through an end-point, the end-point facilitating a network connection between the first storage system and the second storage system, the apparatus involving a processor, configured to receive user requirements for the copy operation of a storage volume; for a determination that the copy operation of the storage volume meets the user requirements, execute the copy operation on the storage volume from the first storage system to the second storage system; and continuously adjust the end-point to facilitate a copy speed of the storage volume that meets the user requirements.

BRIEF DESCRIPTION OF DRAWINGS

FIG. 3 illustrates an example of a user requirement table, in accordance with an embodiment.

FIG. 4 illustrates an example of a source volume information table, in accordance with an embodiment.

FIG. 5 illustrates an example of a destination volume information table, in accordance with an embodiment.

FIG. 6 illustrates an example of a copy progress information table, in accordance with an embodiment.

FIG. 7 illustrates an example of a last copy performance table, in accordance with an embodiment.

DETAILED DESCRIPTION

Figure 1:
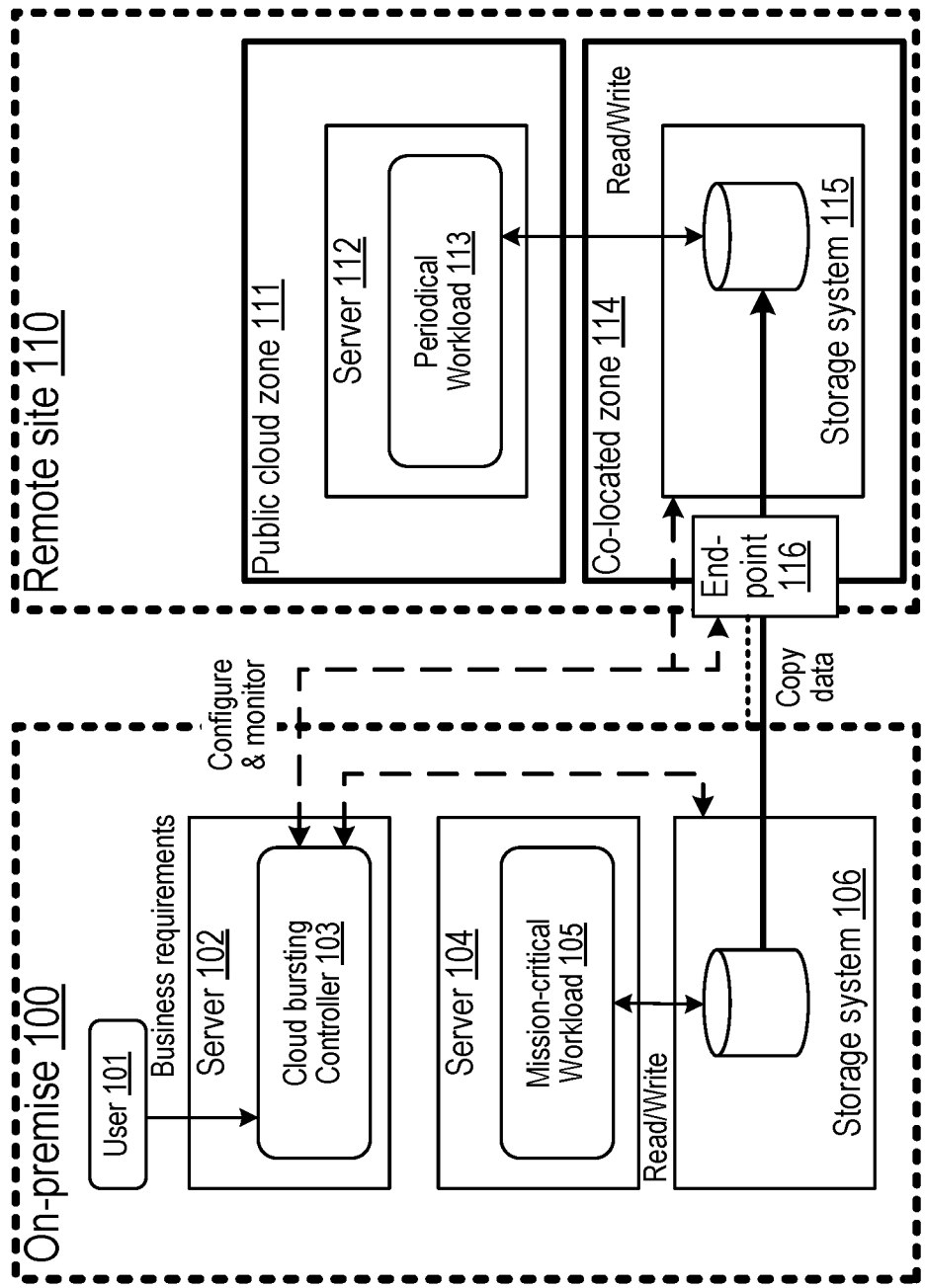
FIG. 1 illustrates an example overview of the system, in accordance with an embodiment.

The following detailed description provides details of the figures and embodiments of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Embodiments as described herein can be utilized either singularly or in combination and the functionality of the embodiments can be implemented through any means according to the desired implementations.

In an embodiment, there is a cloud-bursting system utilizing the optimal resources of a storage system used by a public cloud within the range of requirements of business operation specified by a user.

FIG. 1 illustrates an example overview of the system, in accordance with an embodiment. In the example illustrated in FIG. 1, there is an on-premise 100 and a remote site 110 connected with network. The on-premise site 100 includes a server 102 that implements a cloud bursting controller application 103 to which a user 101 specifies business operations, a server 104 implementing a mission-critical workload 105, and a storage system 106 that has a storage volume on which the mission-critical workload 105 reads and/or writes data. The mission critical workload 105 is assumed to be executed continuously. In this embodiment, the cloud bursting controller application 103 is in the on-premise site 100, but it may be in the public cloud zone 111, the co-located zone 114, or another site depending on the desired implementation. It also may involve hardware implementations as well as software implementations. The servers can be in the form of physical machines, virtual machines or other configurations such as a container depending on the desired implementation. The storage system 106 can be in the form of a monolithic or distributed architecture and it could be hardware-based or software-defined.

The remote site 110 includes a public cloud zone 111 as controlled by a public cloud vendor, and a co-located zone 114 which is owned by the same owner of the on-premise site 100 or another owner who provides a storage volume to the owner of the on-premise site 100. The public cloud zone 111 and the co-located zone 114 are geographically close, and can be in the same facility but are not limited thereto. An end-point 116 is a network feature in the remote site 110 to which the servers and the storage system in the on-premise site 100 connect. The end-point 116 can be in the form of a device or node that is connected to the Local Area Network (LAN) or Wide Area Network (WAN) and configured to accept communications between the on-premise 100 and the remote site 110 across the network. Examples of such a device to facilitate the end-point 116 can include a network switch, but is not limited thereto.

In the public cloud zone 111, there is a server 112 running a periodical workload application 113 that is executed for a limited-time and periodically (e.g. once a month for 6 hours). The server 112 can be implemented as a physical machine, a virtual machine or any other configuration such as a container to facilitate the desired implementation. In the co-located zone 114, there is a storage subsystem 115 that has a storage volume to which the application in the public cloud 111 reads and writes data. The storage system 115 can be a monolithic or distributed architecture and it can be hardware-based or software-defined in accordance with the desired implementation.

Figure 2:
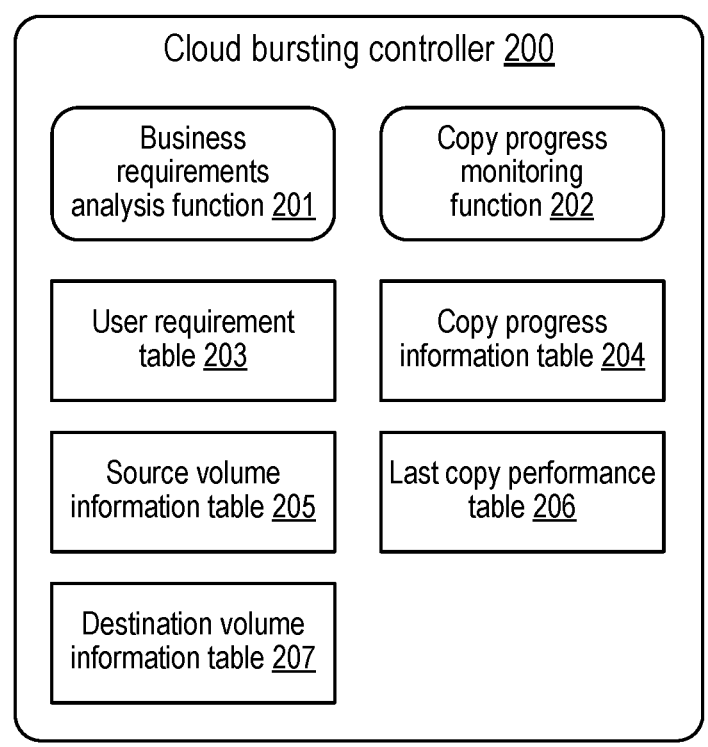
FIG. 2 shows an example configuration of a cloud bursting controller, in accordance with an embodiment.

FIG. 2 shows an example configuration of a cloud bursting controller, in accordance with an embodiment. The cloud bursting controller 200 has a business requirements analysis function 201 that is configured to retrieve business requirements given from a user, analyze the requirements, and configure storage systems to meet the requirements. There is a copy progress monitoring function 202, which monitors the data copy progress from a storage system 106 in the on-premise 100 to a storage system 115 in the co-located zone 114 to ensure that the copy ends within the user requirements, and changes storage configurations and end-point configurations when the copy is expected not to end within the user requirements. The cloud bursting controller 200 has a user requirement table 203, a source volume information table 205, a destination volume information table 207, a copy progress information table 204 and a last copy performance table 206.

FIG. 3 illustrates an example of a user requirement table 203, in accordance with an embodiment. The user requirement table 203 has a workload identifier (ID) field, a source volume ID field, a target workload start time field and a target workload end time field in each row. The information is retrieved from the user business requirements as provided by the user 101.

FIG. 4 illustrates an example of a source volume information table 205, in accordance with an embodiment. The source volume information table 205 has a source volume ID field, a capacity field and a maximum copy speed field in each row. The information is retrieved from the storage system 106 in the on-premise site 100.

FIG. 5 illustrates an example of a destination volume information table 207, in accordance with an embodiment. The destination volume information table 207 has a source volume ID field, a destination volume ID field, a capacity field, a target volume copy performance field and a target end-point copy performance field in each row. In embodiments, the target volume copy performance and the target end-point copy performance is derived according to the capacity of the volume subject to the copy operation from the source volume information table 205 of FIG. 4, the maximum copy speed from the source volume information table 205, and from the time the copy operation is to be initiated versus the start of the workload as provided in the user requirements 203 of FIG. 3. For example, if the cloud controller schedules the operation immediately, the delta of time between the current time (e.g., if the copy operation were to be initiated immediately) and the target workload start time is the time available to complete the copy operation. The capacity of the volume is divided by the derived available time of the copy operation to determine the target volume copy performance and the target end-point copy performance. Both values can be adjusted based on additional factors, such as current workloads, other scheduled operations, expected network congestion, and so on in accordance with the desired implementation. The target volume copy performance and the target end-point copy performance can be used to configure the storage system 106, storage system 115, and end-point 116 respectively. For example, end-point 116 is configured to allocate bandwidth to meet or exceed the target end-point copy performance. Target volume copy performance and capacity can be used to configure storage system 115 to allocate the appropriate storage devices to create the storage volume and CPUs to facilitate the copy operation.

FIG. 6 illustrates an example of a copy progress information table 204, in accordance with an embodiment. It has a destination volume ID field, a copy start time field, a target copy end time field and an estimated copy end time field in each row. Such information is derived from the configurations set forth to the end-point 116 and storage systems 115 and 106 based on the information of the destination volume information table 207 of FIG. 5.

FIG. 7 illustrates an example of a last copy performance table 206, in accordance with an embodiment. The last copy performance table 206 has a workload ID field, a data capacity field, an average target volume copy performance field, an average target end-point copy performance field, an average actual copy performance field and a required time field in each row. The information is updated at the end of corresponding copy by the copy progress monitoring function 202.

Figure 8:
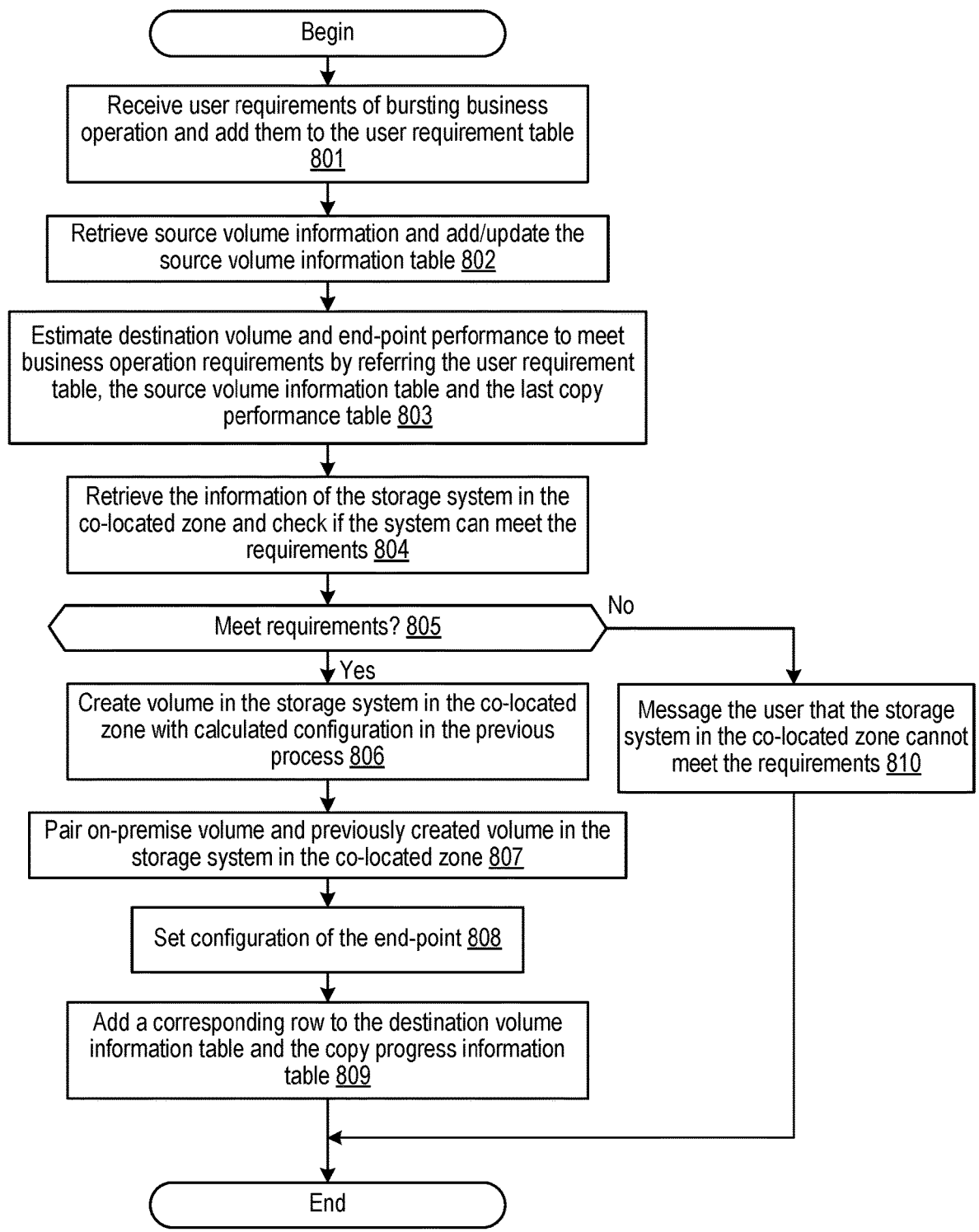
FIG. 8 illustrates an example flow diagram of analyzing business requirements and configuring the storage system in the business requirements analysis function, in accordance with an embodiment.

FIG. 8 illustrates an example flow diagram of analyzing business requirements and configuring the storage system in the business requirements analysis function 201, in accordance with an embodiment. At 801, the function 201 receives requirements for business (e.g. target workload, source volume, copy start time, time to finish the copy, etc.) from a user 101 and adds the corresponding row in the user requirement table 203 of FIG. 3. At 802, the function 201 retrieves the corresponding source volume information from the storage system 106 in the on-premise zone 100 and adds or updates the corresponding row in the source volume information table 205 as illustrated in FIG. 4.

At 803, the function 201 estimates the destination volume capacity and performance to meet business operation requirements by referring to the user requirement table 203, the source volume information table 205, and the last copy performance table 206. At 804, the function 201 retrieves the information of the storage system 115 in the co-located zone 114 and checks if the storage system 115 can meet the requirements sent from the user at 805. If the storage system 115 cannot meet the requirements (No), then the function 201 messages the user that the storage system 115 cannot meet the requirements at 810 and ends the flow. If the storage system 115 can meet the requirements (Yes), then the function 201 proceeds to 806 wherein the function 201 creates a volume to the storage system 115 in the co-located zone 114 with the configuration estimated in the previous process at 803. Meeting the requirements can include determining if the storage system 115 has capacity to allocate for the copy operation, if the scheduled workload can be slotted in for the storage system 115 in comparison to outstanding workloads, and so on.

At 807, the function 201 pairs the corresponding volume in the storage system 106 in the on-premise site 100 with the volume in the storage system 115 in the co-located zone 114.

At 808, the function 201 configures the end-point 116 in the remote site 110. Such configuration can include creating a path between the storage system 115 and storage system 114, setting bandwidth parameters, and so on.

Then at 809, the function 201 adds the corresponding row to the destination volume information table 207 and the copy progress information table 204.

Figure 9:
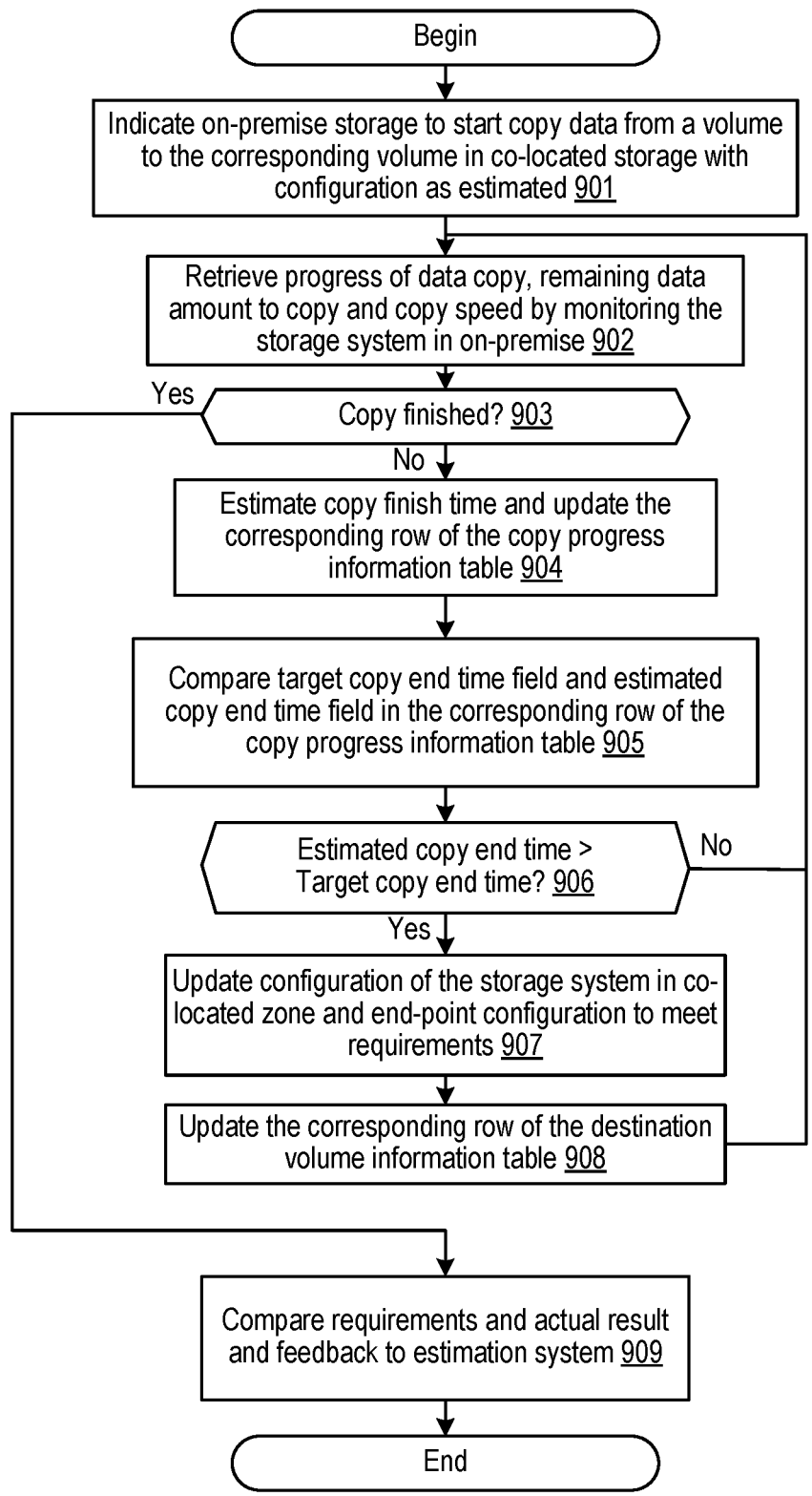
FIG. 9 illustrates an example flow diagram of copy progress monitoring and feedback to the next cloud-bursting situation done by the copy progress monitoring function in the cloud bursting controller, in accordance with an embodiment.

FIG. 9 illustrates an example flow diagram of copy progress monitoring and feedback to the next cloud-bursting situation done by the copy progress monitoring function 202 in the cloud bursting controller 200, in accordance with an embodiment.

At 901, the function 202 sends a command to the on-premise storage system 106 to start copying data from the volume to the corresponding volume in the storage system 115 in the co-located zone 114 paired by the business requirements analysis function 201.

At 902, the function 202 retrieves the progress of the data copy, the remaining data amount to copy and the copy speed by monitoring the corresponding storage system 106 in the on-premise site 100.

At 903, a determination is made as to whether the copy is finished. If the copy is finished (Yes), the function 202 proceeds to 909 and compares the target copy end time in the copy progress information table 204 and the actual copy end time, and provides feedback on the difference to the next cloud-bursting situation by adding/updating the corresponding row of the last copy performance table 206. If the copy is not finished (No), the function 202 proceeds to 904 and estimates the copy finish time from the information retrieved at 902, and updates the corresponding row of the copy progress information table 204. To estimate the copy finish time, divide the remaining data amount to copy by the copy speed, both of which are retrieved at 902.

At 905, the function 202 compares the target copy end time field and the estimated copy end time field in the corresponding row of the copy progress information table 204. At 906, a determination is made as to whether the estimated copy end time is later than the target copy end time. If the estimated copy end-time is later than the target copy end time (Yes), the function 202 proceeds to 907 and updates the configurations of the storage system 106/115 and the end-point 116 in the co-located zone 114 to meet requirements, and proceeds to 908 to update the corresponding row of the destination volume information table 207. Then, the function 202 proceeds back to 902. Function 202 updates the configurations of the end-point 116 by, for example, allocating additional bandwidth to the path between the storage system 115 and storage system 106. Updates to the configuration of the storage system 106/115 can include allocation of additional bandwidth to the copy process, allocation of additional central processing units (CPUs) to handle other storage system operations while the copy process is in operation, allocating additional capacity to storage system 115, and so on.

If the estimated copy end time is earlier than the target copy (No), then the function 202 proceeds back to 902.

At 909, the function 202 compares the user requirements to the actual result of the copy operation and provides feedback to the estimation system by modifying the function 202 based on the result. To facilitate this process, the information from the last copy performance table 206 as illustrated in FIG. 7 is updated so that the average actual copy performance, average target end-point copy performance, and average target volume copy performance is updated to average in the results obtained for the most recently finished copy for the workload ID corresponding to the storage volume copied over during the copy operation.

Through the embodiments described herein, the control of on-premise and co-located storages and an end-point can be facilitated to utilize optimal resources on a remote site, including the end-point, the co-located storage and a public cloud resources within the user requirements of business operation. Hence the embodiments reduce the total cost to use remote site resources as well as meeting the user requirements.

Figure 10:
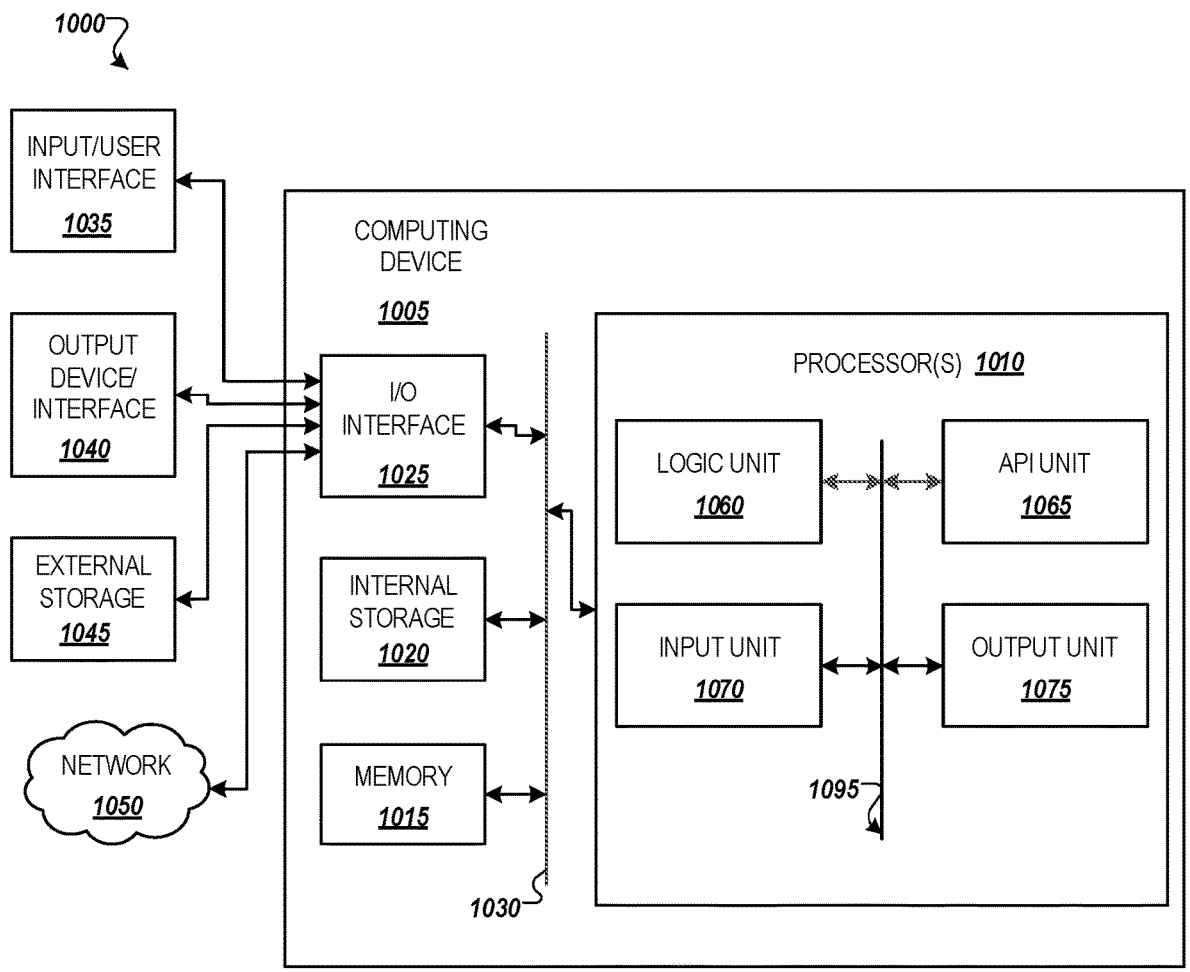
FIG. 10 illustrates an example computing environment with an example computer device suitable for use in some embodiments, such as a server managing a first and second storage system through a cloud bursting controller.

FIG. 10 illustrates an example computing environment with an example computer device suitable for use in some embodiments, such as a server managing a first and second storage system through a cloud bursting controller 103 as illustrated in FIG. 1. In embodiments, such computer devices are configured to facilitate a copy operation of a storage volume from a first storage system to a second storage system through an end-point, wherein the end-point facilitates a network connection between the first storage system and the second storage system. In the embodiment as illustrated in FIG. 1, the first storage system 106 is located on an on-premise site 100, and the second storage system 115 is implemented in a co-located zone 114 on a remote site 110 facilitating a public cloud 111. However, other configurations are possible depending on the desired implementation, and the present disclosure is not limited thereto (e.g., both storage systems being on-premise 100 or co-located in the co-located zone 114).

Computer device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computer device 1005. I/O interface 1025 is also configured to receive images from cameras or provide images to projectors or displays, depending on the desired implementation.

Computer device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some embodiments, input/user interface 1035 and output device/interface 1040 can be embedded with or physically coupled to the computer device 1005. In other embodiments, other computer devices may function as or provide the functions of input/user interface 1035 and output device/interface 1040 for a computer device 1005.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via I/O interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

I/O interface 1025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computer device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1010 can execute under any operating system (OS) (not shown), in a native or virtual environment and can be in the form of physical hardware processors such as Central Processing Units (CPUs) or a combination of software and hardware processors. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided.

In some embodiments, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, input unit 1070, output unit 1075, in some embodiments described above. For example, the flow of one or more processes or implementations may be controlled by logic unit 1060 alone or in conjunction with API unit 1065. The input unit 1070 may be configured to obtain input for the calculations described in the embodiments, and the output unit 1075 may be configured to provide output based on the calculations described in embodiments.

Processor(s) 1010 can be configured to facilitate the functionality of the business requirements analysis function 201 and the copy progress monitoring function 202. Memory 1015 can be configured to manage the user requirement table 203, the copy progress information table 204, the source volume information table 205, the last copy performance table 206 and the destination volume information table 207. Processor(s) 1010 and memory 1015 can operate in tandem to facilitate the functionality of cloud bursting controller 200.

Processor(s) 1010 can be configured to receive user requirements for the copy operation of a storage volume as illustrated in FIG. 3 and 801 of FIG. 8. For a determination that the copy operation of the storage volume meets the user requirements, processor(s) 1010 can be configured to execute the copy operation on the storage volume from the first storage system to the second storage system as illustrated in 806-809 of FIG. 8, and FIG. 9, and continuously adjust the end-point to facilitate a copy speed of the storage volume that meets the user requirements as illustrated by the iterations of 902-908 of FIG. 9 while the copy operation is being executed.

As illustrated in FIG. 3, the user requirements can involve a start time to initiate a workload on the storage volume through the second storage system, and can also involve a duration of a workload to be implemented onto the storage volume through the public cloud depending on the desired implementation. Processor(s) 1010 can be configured to conduct the determination that the copy operation of the storage volume meets the user requirements by estimating time needed to execute the copy operation of the storage volume based on copy performance information for the storage volume, the copy performance information indicative of an estimated copy speed determined from previous copy operations for the storage volume and for the time needed to execute the copy operation meeting the start time to initiate the workload, determining that the copy operation of the storage volume meets the user requirements as illustrated at 803-805 of FIG. 8.

In embodiments, processor(s) 1010 can be configured to execute the copy operation on the storage volume from the first storage system to the second storage system by creating another storage volume in the second storage system according to a configuration determined from the user requirements as illustrated at 806 of FIG. 8; pairing the storage volume of the first storage system with the another storage volume in the second storage system as illustrated at 807 of FIG. 8; configuring the end-point based on the user requirements as illustrate at 808 of FIG. 8; executing the copying of the storage volume to the another storage volume through the end-point as illustrated in FIG. 9; and updating destination volume information and copy progress information for the another storage volume as illustrated at 809 of FIG. 8.

Processor(s) 1010 can be configured to continuously adjust the end-point to facilitate a copy speed of the storage volume that meets the user requirements by retrieving a progress of the executing of the copy operation from the first storage system as illustrated at 902 of FIG. 9; and while the copy operation is executing as illustrated from 903-908 of FIG. 9, estimating an end time for the copy operation as illustrated at 904 of FIG. 9; and updating the progress of the executing of the copy operation as illustrated at 904 of FIG. 9. For the estimated end time for the copy operation being later than a target copying end time as illustrated at 906 to 908 of FIG. 9, processor(s) 1010 can be configured to update a configuration of the end-point to meet the user requirements as illustrated at 907; and update the destination volume information for the storage volume as illustrated at 908 of FIG. 9.

Processor(s) 1010 can be configured to, for a completion of the copy operation, compare the user requirements and a result of the copy operation and update copy performance information associated with the storage volume as illustrated at 909 of FIG. 9.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In embodiments, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Embodiments may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the embodiments are not described with reference to any particular programming language. It will be appreciated that a variety of programming languages may be used to implement the teachings of the embodiments as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the embodiments may be implemented using circuits and logic devices (hardware), while other aspects may be implemented using instructions stored on a machine-readable medium (software), which if executed by a processor, would cause the processor to perform a method to carry out implementations of the present application. Further, some embodiments of the present application may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described embodiments may be used singly or in any combination. It is intended that the specification and embodiments be considered as examples only, with the true scope and spirit of the present application being indicated by the following claims.

What is claimed is:

1. A method for facilitating a copy operation of a storage volume from a first storage system to a second storage system through an end-point, the end-point facilitating a network connection between the first storage system and the second storage system, the method comprising:

receiving user requirements for the copy operation of a storage volume;

for a determination that the copy operation of the storage volume meets the user requirements:
    executing the copy operation on the storage volume from the first storage system to the second storage system; and
    continuously adjusting the end-point to facilitate a copy speed of the storage volume that meets the user requirements;
wherein the user requirements comprises a start time to initiate a workload on the storage volume through the second storage system, wherein the determination that the copy operation of the storage volume meets the user requirements comprises:
    estimating time needed to execute the copy operation of the storage volume based on copy performance information for the storage volume, the copy performance information indicative of an estimated copy speed determined from previous copy operations for the storage volume; and
    for the time needed to execute the copy operation meeting the start time to initiate the workload, determining that the copy operation of the storage volume meets the user requirements.

2. The method of claim 1, wherein the executing the copy operation on the storage volume from the first storage system to the second storage system comprises:
creating another storage volume in the second storage system according to a configuration determined from the user requirements;
pairing the storage volume of the first storage system with the another storage volume in the second storage system;
configuring the end-point based on the user requirements;
executing the copying of the storage volume to the another storage volume through the end-point; and
updating destination volume information and copy progress information for the another storage volume.

3. The method of claim 1, wherein the continuously adjusting the end-point to facilitate a copy speed of the storage volume that meets the user requirements comprises:
retrieving a progress of the executing of the copy operation from the first storage system;
while the copy operation is executing:
    estimating an end time for the copy operation;
    updating the progress of the executing of the copy operation;
    for the estimated end time for the copy operation being later than a target copying end time:
updating a configuration of the end-point to meet the user requirements; and
updating destination volume information for the storage volume.

4. The method of claim 1, further comprising, for a completion of the copy operation, comparing the user requirements and a result of the copy operation and updating copy performance information associated with the storage volume.

5. The method of claim 1, wherein the first storage system is located on an on-premise site, the second storage system is implemented in a co-located zone on a remote site facilitating a public cloud, wherein the user requirements comprise a duration of a workload to be implemented onto the storage volume through the public cloud.

6. A non-transitory computer readable medium, storing instructions for facilitating a copy operation of a storage volume from a first storage system to a second storage system through an end-point, the end-point facilitating a network connection between the first storage system and the second storage system, the instructions comprising:
receiving user requirements for the copy operation of a storage volume;
for a determination that the copy operation of the storage volume meets the user requirements:
    executing the copy operation on the storage volume from the first storage system to the second storage system; and
    continuously adjusting the end-point to facilitate a copy speed of the storage volume that meets the user requirements;
wherein the user requirements comprises a start time to initiate a workload on the storage volume through the second storage system; wherein the determination that the copy operation of the storage volume meets the user requirements comprises:
    estimating time needed to execute the copy operation of the storage volume based on copy performance information for the storage volume, the copy performance information indicative of an estimated copy speed determined from previous copy operations for the storage volume; and
    for the time needed to execute the copy operation meeting the start time to initiate the workload, determining that the copy operation of the storage volume meets the user requirements.

7. The non-transitory computer readable medium of claim 6, wherein the executing the copy operation on the storage volume from the first storage system to the second storage system comprises:
creating another storage volume in the second storage system according to a configuration determined from the user requirements;
pairing the storage volume of the first storage system with the another storage volume in the second storage system;
configuring the end-point based on the user requirements;
executing the copying of the storage volume to the another storage volume through the end-point; and
updating destination volume information and copy progress information for the another storage volume.

8. The non-transitory computer readable medium of claim 6, wherein the continuously adjusting the end-point to facilitate a copy speed of the storage volume that meets the user requirements comprises:
retrieving a progress of the executing of the copy operation from the first storage system;
while the copy operation is executing:
    estimating an end time for the copy operation;
    updating the progress of the executing of the copy operation;
    for the estimated end time for the copy operation being later than a target copying end time:
updating a configuration of the end-point to meet the user requirements; and
updating destination volume information for the storage volume.

9. The non-transitory computer readable medium of claim 6, the instructions further comprising, for a completion of the copy operation, comparing the user requirements and a result of the copy operation and updating copy performance information associated with the storage volume.

10. The non-transitory computer readable medium of claim 6, wherein the first storage system is located on an on-premise site, the second storage system is implemented in a co-located zone on a remote site facilitating a public cloud, wherein the user requirements comprise a duration of a workload to be implemented onto the storage volume through the public cloud.

11. An apparatus configured to facilitate a copy operation of a storage volume from a first storage system to a second storage system through an end-point, the end-point facilitating a network connection between the first storage system and the second storage system, the apparatus comprising:
a processor, configured to:
receive user requirements for the copy operation of a storage volume;
for a determination that the copy operation of the storage volume meets the user requirements:
execute the copy operation on the storage volume from the first storage system to the second storage system; and
continuously adjust the end-point to facilitate a copy speed of the storage volume that meets the user requirements;
wherein the user requirements comprises a start time to initiate a workload on the storage volume through the second storage system; wherein the processor is configured to conduct the determination that the copy operation of the storage volume meets the user requirements by:
estimating time needed to execute the copy operation of the storage volume based on copy performance information for the storage volume, the copy performance information indicative of an estimated copy speed determined from previous copy operations for the storage volume; and
for the time needed to execute the copy operation meeting the start time to initiate the workload, determining that the copy operation of the storage volume meets the user requirements.

12. The apparatus of claim 11, wherein the processor is configured to execute the copy operation on the storage volume from the first storage system to the second storage system by:
creating another storage volume in the second storage system according to a configuration determined from the user requirements;
pairing the storage volume of the first storage system with the another storage volume in the second storage system;
configuring the end-point based on the user requirements;
executing the copying of the storage volume to the another storage volume through the end-point; and
updating destination volume information and copy progress information for the another storage volume.

13. The apparatus of claim 11, wherein the processor is configured to continuously adjust the end-point to facilitate a copy speed of the storage volume that meets the user requirements by:
retrieving a progress of the executing of the copy operation from the first storage system;
while the copy operation is executing:
estimating an end time for the copy operation;
updating the progress of the executing of the copy operation;
for the estimated end time for the copy operation being later than a target copying end time:
updating a configuration of the end-point to meet the user requirements; and
updating destination volume information for the storage volume.

14. The apparatus of claim 11, the processor further configured to, for a completion of the copy operation, compare the user requirements and a result of the copy operation and update copy performance information associated with the storage volume.

15. The apparatus of claim 11, wherein the first storage system is located on an on-premise site, the second storage system is implemented in a co-located zone on a remote site facilitating a public cloud, wherein the user requirements comprise a duration of a workload to be implemented onto the storage volume through the public cloud.

* * * * *